(12) United States Patent
Meyer

(10) Patent No.: US 11,427,221 B2
(45) Date of Patent: Aug. 30, 2022

(54) METHOD AND CONTROL DEVICE FOR THE AUTONOMOUS EMERGENCY BRAKING OF AN EGO VEHICLE

(71) Applicant: WABCO Europe BVBA, Brussels (BE)

(72) Inventor: Ruediger Meyer, Hannover (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 160 days.

(21) Appl. No.: 16/613,812

(22) PCT Filed: Apr. 17, 2018

(86) PCT No.: PCT/EP2018/059722
§ 371 (c)(1),
(2) Date: Nov. 15, 2019

(87) PCT Pub. No.: WO2018/210509
PCT Pub. Date: Nov. 22, 2018

(65) Prior Publication Data
US 2020/0148229 A1    May 14, 2020

(30) Foreign Application Priority Data

May 19, 2017    (DE) .......................... 102017111004.6

(51) Int. Cl.
*B60W 60/00*     (2020.01)
*B60T 7/12*       (2006.01)
(Continued)

(52) U.S. Cl.
CPC ........... *B60W 60/0015* (2020.02); *B60T 7/12* (2013.01); *B60T 8/17558* (2013.01);
(Continued)

(58) Field of Classification Search
CPC .. B60W 60/0015; B60W 30/09; B60W 50/14; B60W 2554/80; B60W 2300/14;
(Continued)

(56) References Cited

U.S. PATENT DOCUMENTS

2006/0097570 A1* 5/2006 Doerr .................... B60Q 5/006
                                                         303/193
2013/0211687 A1  8/2013 Trsot et al.
(Continued)

FOREIGN PATENT DOCUMENTS

CN         103370238 A    10/2013
CN         105607598 A     5/2016
(Continued)

*Primary Examiner* — Muhammad Shafi
(74) *Attorney, Agent, or Firm* — Leydig, Voit & Mayer, Ltd.

(57) ABSTRACT

A method for autonomous emergency braking of an ego vehicle includes capturing driving-dynamics variables of the ego vehicle, capturing distance measurement signals, determining a longitudinal distance of the ego vehicle from an object in front, detecting an emergency braking situation based on the driving-dynamics variables and the distance measurement signals. The method further includes advanced determining or projecting, in response to the detecting the emergency braking situation, of first, second, and third starting points for initiation of a warning phase, a subsequent partial braking phase, and an emergency braking brake pressure. The advanced determining or projecting of the first, second, and/or third starting points includes: setting up a minimum period criterion with at least one minimum period and projecting, in advance in accordance with the longitudinal distance from the object, a criticality function that represents a criticality of the traffic situation.

17 Claims, 4 Drawing Sheets

(51) Int. Cl.
*B60T 8/1755* (2006.01)
*B60W 30/09* (2012.01)
*B60W 50/14* (2020.01)

(52) U.S. Cl.
CPC ............ *B60W 30/09* (2013.01); *B60W 50/14* (2013.01); *B60T 2201/022* (2013.01); *B60W 2554/80* (2020.02)

(58) Field of Classification Search
CPC ........... B60W 2554/00; B60W 30/095; B60W 30/16; B60W 30/165; B60T 7/12; B60T 8/17558; B60T 2201/022; B60T 8/1755; B60T 7/22; G08G 1/165
USPC .......................................................... 701/23
See application file for complete search history.

(56) References Cited

U.S. PATENT DOCUMENTS

| | | | |
|---|---|---|---|
| 2013/0335553 A1* | 12/2013 | Heger | ................... B60Q 9/008 348/118 |
| 2014/0052355 A1 | 2/2014 | Heinrichs-Bartscher et al. | |
| 2014/0052358 A1 | 2/2014 | Engelman et al. | |
| 2015/0012204 A1* | 1/2015 | Breuer | ................... G08G 1/166 701/96 |
| 2016/0280134 A1* | 9/2016 | Miura | ...................... G08G 1/04 |
| 2017/0113668 A1 | 4/2017 | Jeon | |
| 2018/0025643 A1 | 1/2018 | Yamamoto | |
| 2018/0072224 A1* | 3/2018 | Hecker | ................ G05D 1/0289 |

FOREIGN PATENT DOCUMENTS

| | | | |
|---|---|---|---|
| CN | 106608259 A | | 5/2017 |
| CN | 106627531 A1 | | 5/2017 |
| DE | 102010008208 A1 | | 8/2011 |
| DE | 102010049351 A1 | | 4/2012 |
| DE | 10-2012-211509 | * | 1/2014 |
| DE | 102015104547 A1 | | 9/2016 |
| EP | 2814704 B1 | | 7/2016 |
| KR | 10-1793827 | * | 11/2017 |
| WO | WO 2004028847 A1 | | 4/2004 |
| WO | WO 2016129231 A1 | | 8/2016 |

* cited by examiner

METHOD AND CONTROL DEVICE FOR THE AUTONOMOUS EMERGENCY BRAKING OF AN EGO VEHICLE

CROSS REFERENCE TO RELATED APPLICATIONS

This application is a U.S. National Phase application under 35 U.S.C. § 371 of International Application No. PCT/EP2018/059722, filed on Apr. 17, 2018, and claims benefit to German Patent Application No. DE 10 2017 111 004.6, filed on May 19, 2017. The International Application was published in German on Nov. 22, 2018 as WO 2018/210509 A1 under PCT Article 21(2).

FIELD

The invention relates to a method for the autonomous emergency braking of an ego vehicle and to a control device for a driving-dynamics system for the autonomous emergency braking of an ego vehicle.

BACKGROUND

A method and a control device for autonomous emergency braking are known e.g. from EP 2 814 704 B1. Autonomous emergency brake systems serve, in particular, to detect an emergency braking situation when driving state variables and further measurement variables, in particular a distance measurement from an object in front, are determined, and to initiate a braking operation autonomously, i.e. automatically. For this purpose, e.g. a control device of the driving-dynamics system can output an external brake signal (XBR) to a brake-device control device so that the latter outputs a brake signal to wheel brakes. Furthermore, such a driving-dynamics system can already be integrated into the brake device. With such an emergency brake system (autonomous emergency brake system, AEBS), it is therefore possible to entirely avoid a collision or a tail-end collision with a sensed object in front, or else to reduce the severity of an accident.

In such emergency brake systems or emergency braking methods it is therefore possible to use the dynamic behavior of the ego vehicle e.g. as an equation of motion of the second order of time (location function with second degree derivatives over time) with the current position, speed and acceleration, and corresponding values can be formed for the sensed object so that motions of equation of the ego vehicle and of the object, or else difference values, i.e. a differential distance and differential velocities are formed. As a result, a dynamic criterion can be formed in the longitudinal direction (longitudinal dynamics criterion). Furthermore, a lateral-dynamic behavior can also be taken into account which can be determined e.g. as an avoidance criterion and takes into account a possible avoidance maneuver of the driver to the side.

In such brake systems there can also be a warning phase provided before the initiation of the autonomous emergency braking, in which phase a warning signal is displayed to the driver indicating that emergency braking is imminent. Therefore, the driver can now already initiate, e.g. automatically, a braking operation or else initiate an avoidance maneuver. Furthermore there can also be provision that the driver can suppress the detected emergency braking situation if he detects that a false detection is present and the supposed object should not be evaluated as a real object but rather the distance sensor has detected e.g. a bridge or other constriction as an object which presents a risk of a collision.

Furthermore, haptic warning phases are known in which the imminent initiation of an emergency braking phase is communicated to the driver haptically by means of a slight braking operation, i.e. as a braking jolt.

Generally, after the warning phases the emergency braking phase is the preferably initiated with a maximum brake pressure. In this context, minimum time periods can be provided for the warning phases in order to give the driver sufficient time.

SUMMARY

In an embodiment, the present invention provides a method for autonomous emergency braking of an ego vehicle. The method includes capturing driving-dynamics variables of the ego vehicle, capturing distance measurement signals, determining a longitudinal distance of the ego vehicle from an object in front, detecting an emergency braking situation based on the driving-dynamics variables and the distance measurement signals, and advanced determining or projecting, in response to the detecting the emergency braking situation: a first starting point for initiation of a warning phase to output a warning signal without initiation of a braking operation, a second starting point for initiation of a subsequent partial braking phase with a partial-braking brake pressure, and a third starting point for initiation of a subsequent emergency braking phase with an emergency braking brake pressure greater than the partial-braking brake pressure. The advanced determining or projecting of the first, second, and/or third starting point includes: setting up a minimum period criterion with at least one minimum period of the warning phase and/or sum of the warning phase and partial braking phase, which is not undershot, and projecting, in advance in accordance with the longitudinal distance from the object, a criticality function that represents a criticality of the traffic situation. K thresholds for the initiation of the warning phase, the partial braking phase and the emergency braking phase are stipulated for the projected criticality function such that, when the minimum period is reached, the criticality function has already exceeded a K threshold for the initiation of the emergency braking phase.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIGS. 2 to 4 each show diagrams which represent, in the upper part, the phases of an emergency braking process as escalation stages, and in the lower part a dynamic criticality value, in each case in accordance with the longitudinal distance between the ego vehicle and the object; in which context

FIG. 3 shows an illustration corresponding to FIG. 2b in which the emergency braking phase can be avoided on the basis of a changed behavior;

FIG. 4 shows an illustration corresponding to FIGS. 2b and 3 in which, after an initially reduced criticality level as a result of the behavior of the object, an emergency braking phase is to be subsequently initiated.

DETAILED DESCRIPTION

Figure 1:
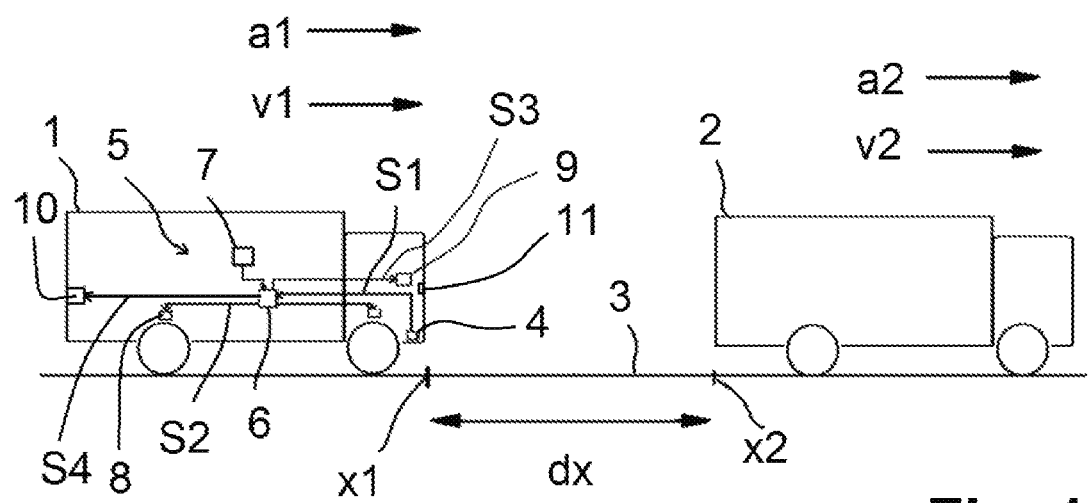
FIG. 1 shows an illustration of a road scene of a vehicle according to an embodiment of the invention.

In processes of determining the emergency braking as an equation of motion over time and when time periods are used for the warning phases before the initiation of the braking process it is possible to determine a very early time at which the warning phase is initiated. Very early first times for the initiation of the warning phase can, however, be unjustified in certain circumstances and can cause the driver to adopt risky behaviors even though this is not necessarily required.

Furthermore, tolerances of the measuring devices can lead to considerable fluctuations which can give rise to severe fluctuations in the initiation of the phases, in particular during a current taking-into-account process.

Embodiments of the invention provide methods for autonomous emergency braking and control devices for autonomous emergency braking which ensure a high level of safety and reduce unnecessarily early initiation. Furthermore, embodiments of the invention provide vehicles with such a control device.

Therefore, an advanced determination or projection of the traffic situation takes place in order to define in advance three emergency braking phases: warning phase, partial braking phase and emergency braking phase.

The traffic situations are respectively assigned a criticality level which essentially represents a probability level for a collision; therefore, a criticality function or criticality curve is formed in accordance with the longitudinal distance and/or the time, minimum periods, in particular minimum time periods are defined for the initiation of the phases, in particular of the partial braking phase and/or emergency braking phase, which cannot be undershot.

The starting points of the phases, i.e. in particular the starting times and/or the starting longitudinal distances, which are projected in this way, are subsequently essentially complied with during the execution of the emergency braking process, even if the current measurement data of the driving-dynamics variables and/or of the longitudinal distance indicate values which are changed in comparison with the projection. In this context there is preferably provision that the starting point of the initiation of the respective next phase, i.e. the partial braking phase or emergency braking phase, cannot be moved forward, but when the minimum period is satisfied they can be moved backward, i.e. delayed, for example, chronologically or spatially, and therefore under certain circumstances even entirely omitted if the K threshold is no longer reached.

K thresholds for the criticality level for the initiation of the phases are preferably set low in such a way that the minimum periods are complied with in accordance with the projection. In this context, in particular even a tolerance, in particular as a result of measuring inaccuracies, is also taken into account in such a way that preferably an entire tolerance range of the criticality function or K curve exceeds the respective K threshold before the minimum period is reached.

Therefore, a large tolerance range for the definition of the next phase, in particular of the emergency braking phase, owing to tolerances can be prevented. In this context, it can be detected, in particular, that when the partial braking starts in the partial braking phase, a relatively high tolerance can occur in the measurement of the longitudinal distance and the driving-dynamics variables which can give rise to a very large tolerance range for the starting point for the initiation of the emergency braking phase. Therefore, the minimum period, i.e. in particular a minimum warning time can be set for the sum of the first two phases, i.e. of the warning phase and the partial-braking warning phase, which is to have priority and the K thresholds can be correspondingly set to be low according to the projection.

According to the invention, a number of advantages can be achieved. For example, an excessively early onset and an excessively large fluctuation range of the emergency braking phase are prevented. However, current correction is still possible by virtue of the fact that the next escalation (initiation of the next phase) can be moved backward and therefore, under certain circumstances, also be prevented.

The additional expenditure on implementing the invention is low here. It is possible, in particular, to continue to use the existing hardware and also the essential algorithms.

The invention is explained in more detail below on the basis of a number of embodiments and with reference to the appended drawings:

An ego vehicle 1 is traveling on a roadway 3 and at a velocity v1 (first velocity) and with a longitudinal acceleration a1 (first longitudinal acceleration). In this context, according to FIG. 1 initially only movements in the longitudinal direction or x direction are considered. In front of the ego vehicle 1 there is, at a longitudinal distance dx, an object 2 which can be e.g. in turn a vehicle which is traveling at a second velocity v2 and with a second longitudinal acceleration a2.

The ego vehicle 1 has a distance sensor 4, e.g. on a radar basis, ultrasound basis or camera system for sensing the longitudinal distance dx, which outputs a relative-distance measurement signal S1 to a control device 6 of a driving-dynamics system 5. The ego vehicle 1 or its driving-dynamics system 5 also has a velocity sensor 7 for sensing the velocity v1 of the ego vehicle, e.g. from the ABS wheel velocity sensors or else the rotational velocity of an output shaft. The control device 6 outputs brake signals S2 to wheel brakes 8 for the execution of a braking operation which therefore generates a negative acceleration, i.e. a first longitudinal acceleration a1 with a negative value. Furthermore, the control device 6 outputs warning signals S3 to a warning display or indicator 9 for the driver, e.g. in the cockpit region of the ego vehicle 1. The warning display or indicator 9 can be embodied in an acoustic and/or optic fashion.

The control device 6 can preferably respectively determine the longitudinal distance dx for the ego vehicle 1 and the object 2 as a second order function of the time.

The ego vehicle 1 can be braked, on the one hand, by the driver by means of driver braking operations and furthermore by autonomous braking operations. For this purpose, an autonomous emergency brake system (AEBS, autonomous emergency brake system) for the initiation of autonomous emergency braking operations is embodied or integrated in the control device 6. The autonomous emergency braking operations can be designed, in particular, to avoid a collision with the object 2 in front and/or also to reduce the severity of an accident with the object 2 in front.

When an external driving-dynamics system 5 is designed to initiate an autonomous braking operation, XBR, (external brake requests) are formed and processed, which can be provided, in particular, by a first control device for the driving-dynamics system 5 and a further control device for the brake system of the ego vehicle 1; for the sake of simplified illustration in a common control device 6 of the driving-dynamics system 5 is provided in FIG. 1; however it is also possible to form separate control devices and for them to communicate with one another.

Figure 2A:
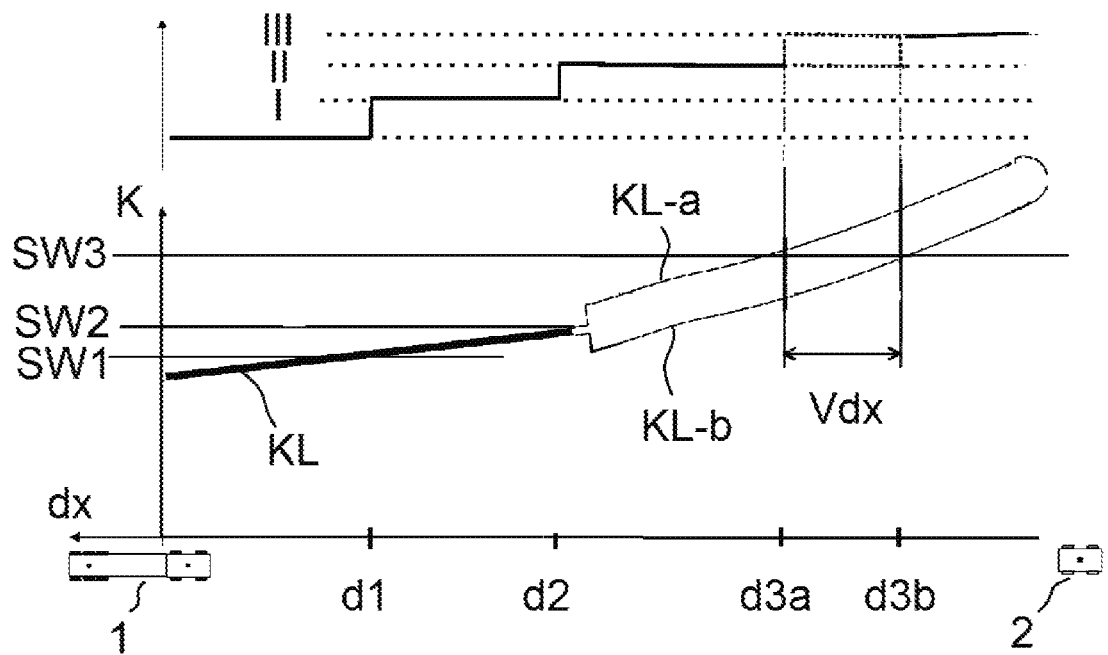
FIGS. 2a and 2b show illustrations of a projection of a traffic situation with determination of the initiation of the phases of the emergency braking on the basis of merely dynamic criteria (in FIG. 2a), and with a minimum warning period_criterion K1 and dynamic criteria K2 which are lowered with respect thereto (in FIG. 2b)
Figure 2B:
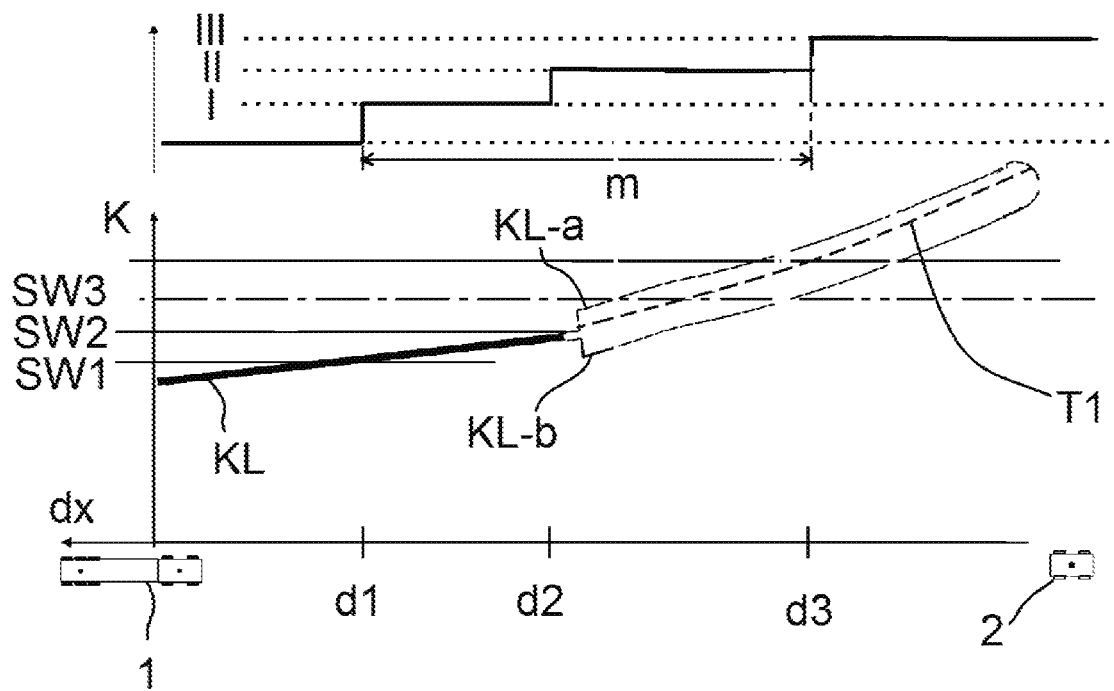
Figure 3:
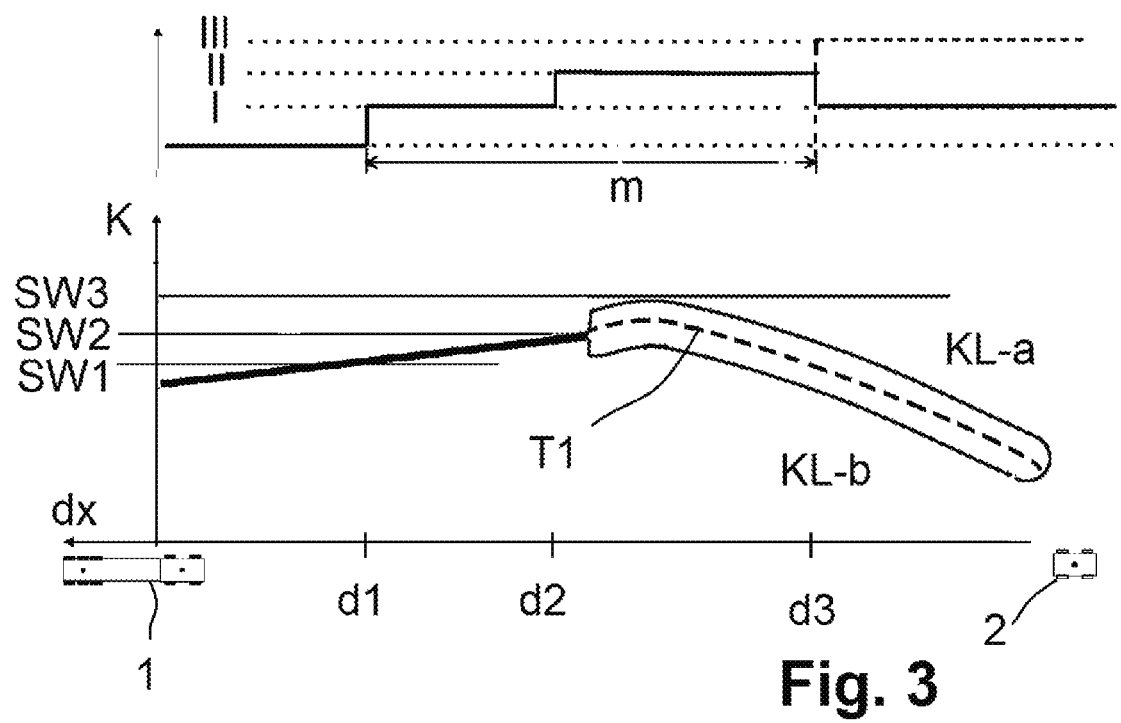
Figure 4:
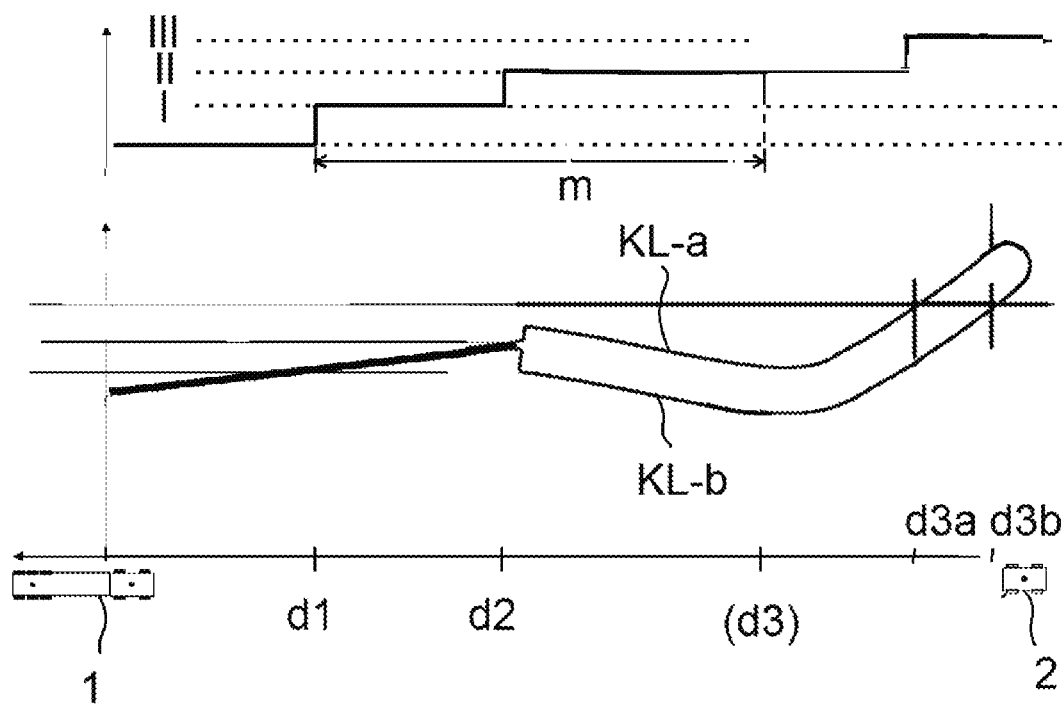

FIGS. 2 to 4 each show diagrams which represent, in an upper part, the phases of an emergency braking process as escalation stages, and in a lower part a dynamic criticality value, in each case in accordance with the longitudinal distance between the ego vehicle and the object.

For the initiation of an emergency braking operation the following phases are provided, which phases are illustrated in FIG. 2a, wherein the longitudinal distance dx is plotted as the abscissa, said longitudinal distance dx decreasing toward the right when the ego vehicle 1 approaches the object 2. A criticality level K, which expresses the probability of a collision e.g. as a scalar value between 0 and 1, is plotted as the ordinate in the lower diagram in FIG. 2a. The criticality level K therefore represents a K function or K curve as a function of the longitudinal distance. In this context, the approaching of the object 2 can also be converted as a chronological approximation so that the criticality level K can be set as a function of the time t.

The various phases of the emergency braking process are plotted as an incremental escalation in the upper diagram in FIG. 2a:

- In a first warning phase I (FCW, forward collision warning) a warning is displayed to the driver by means of the warning display or indicator 9, e.g. as an acoustic sound or optical signal, without an autonomous braking intervention.
- In a subsequent haptic warning phase or partial-braking warning phase II (HCW, haptic collision warning) an autonomous partial braking operation occurs, i.e. with a brake pressure value p_hc which gives rise to a partial acceleration a_hc, e.g. with the acceleration value a_hc=−3.5 m/s$^2$. As a result, a haptic collision warning is output to the driver who notices the braking jolt and as a result is informed about the imminent full braking or emergency braking.
- In the subsequent emergency braking phase III (AEB, autonomous emergency braking) an emergency braking operation then occurs, in particular with the brake pressure p_aeb which can be, in particular, a maximum brake pressure. The emergency braking acceleration a_aeb which is achieved is therefore preferably an acceleration with the maximum braking, e.g. where a_aeb=−6 m/s$^2$.

A brake light signal S4 is preferably already output to brake lights 10 of the ego vehicle 1 during the first warning phase I (and also subsequently in the phases II, III), so that traffic to the rear is informed about the imminent braking. During the calculation of the phases I, II, III the following is taken into account in the control device 6:

The determination of phases I, II, III occurs in advance, i.e. as a projection on the basis of the determined driving-dynamics data v1, a1 and longitudinal distances dx and the chronological behavior thereof.

Therefore, a projection or chronological extrapolation of the traffic situation, in particular the longitudinal distance dx is determined, the traffic situations are each assigned a criticality level K which represents essentially a probability level for a collision, and K thresholds are defined for the criticality level K for the initiation of the phases, and then starting points, in particular starting times and/or starting longitudinal distances for initiation of the phases I, II, III are determined therefrom.

The projected starting points are then subsequently updated during the execution of the emergency braking process.

According to FIG. 2a, the longitudinal distance dx between the ego vehicle 1 and the object 2 is specified on the abscissa (x axis), wherein the ego vehicle 1 approaches from the left and therefore the longitudinal distance dx to the right becomes smaller. In the lower part or lower diagram in FIG. 2 the criticality K therefore increases to the right, since the ego vehicle 1 approaches the object 2 and a collision becomes more probable. The criticality (K value) takes into account here the longitudinal dynamic behavior, i.e. the equations of movement of the second degree over time which are projected into the future, but furthermore also, for example, a lateral-dynamic behavior as e.g. an evaluation criterion, i.e. the possibility of preventing a collision by means of a steering intervention or lateral acceleration.

The initiation of the three phases I, II, III occurs when the following K thresholds of the criticality K level are reached: SW1 as the first K threshold for the initiation of the warning phase I, SW2 as the second K threshold for the initiation of the partial braking phase II, and SW3 as the third K threshold for the initiation of the emergency braking phase III. The initiation of these phases I, II, III according to the upper partial diagram therefore represents an incremental escalation.

At first, the ego vehicle 1 therefore moves in the longitudinal direction x, that is to say with a reduction in dx, toward the object 2 which can correspondingly also move in the longitudinal direction or else be stationary. Correspondingly, according to the indicated criticality curve KL with a reducing longitudinal distance dx, the current K value rises and firstly reaches the first K threshold SW1 at the longitudinal distance d1, so that the warning phase I is initiated. Therefore, for example, the brake light of the ego vehicle 1 is in turn switched on by means of a brake light signal S4, in order to warn the traffic to the rear, and furthermore in particular by means of the warning signal S3 the warning display or indicator 9 is switched on and as a result the driver is already warned without a braking intervention.

If the driver himself does not change his previous driving behavior in a relevant fashion, in particular does not change his current longitudinal acceleration (as active acceleration or else current braking behavior), as the longitudinal distance dx decreases in accordance with the curve KL, the K value increases, until the second K threshold SW2 is reached at a longitudinal distance d2, so that by means of a brake signal S2 the wheel brakes 8 are braked with the relatively low brake pressure value p_hc, as a result of which a haptic brake pressure is generated in order to warn the driver.

However, by means of this brake pressure or of the partial braking the measuring accuracy of the measuring system of the ego vehicle 1 is increased, in particular in order to determine the longitudinal distance dx and the vehicle's own driving dynamics values, that is to say its velocity v1 and its acceleration a1. Furthermore, when the partial brake pressure p_hc is input, the actual braking effect, that is to say the longitudinal acceleration a_hc which is generated is subject to a certain degree of uncertainty or variance which depends e.g. on the roadway 3 or the coefficient of friction or condition thereof, so that a degree of uncertainty or fluctuation range also occurs in the respective dx value. The precise profile of the K curve KL is therefore provided with a relatively high degree of inaccuracy or variance when the partial braking is initiated in the partial braking phase II, which is illustrated in FIG. 2 by means of a relatively broad band, with an upper line KL-a and a lower line KL-b.

In the further profile after the initiation of the partial braking phase II, the K curve KL rises correspondingly, so that firstly the upper curve KL-a intersects the third K threshold SW3 at d3a, and subsequently the lower curve KL-b intersects said third K threshold SW3 at d3b.

Therefore, a height starting variance Vdx=d3b−d3a arises with respect to the longitudinal distance dx, for the initiation of the emergency braking-Phase III which is clarified as a dashed box in the upper diagram.

According to the advantageous embodiment in FIG. 2b, changes are made to the calculation of the starting points d1, d2, d3 in comparison with FIG. 2a:

During the calculation the following criteria are used: a time period criterion K1, according to which the warning phase I and the partial braking phase II have to satisfy minimum periods, in particular chronological minimum periods, i.e. their time periods satisfy e.g. the conditions:

$\Delta t\_I \geq \Delta t0\_I$ (condition K1-I), $\Delta t\_II \geq \Delta t0\_II$ (condition K1-II), and a dynamic criterion K2, which can comprise, in particular, a longitudinal dynamics criterion K2-L in which the previous longitudinal dynamics and the acceleration achieved by means of the autonomous interventions are taken into account and location functions of the second degree of time are produced. In this context, e.g. the condition can also be set so that dx(t4)>0, i.e. the longitudinal distance dx at a final time t4>0, and therefore no collision has taken place.

In the dynamic criterion K2, the emergency braking longitudinal acceleration a_aeb is taken into account in the emergency braking phase III and preferably in the partial braking warning phase II.

Therefore, a minimum time period $\Delta t\_0$ for the total time period of the two warning phases, that is to say of the warning phase I and the partial braking phase (haptic warning phase) II is introduced. The introduction of this minimum time period $\Delta t\_0$ gives rise—translated into the location diagram in FIG. 2—correspondingly to the longitudinal distance minimum value m in longitudinal distance dx between d1 and d3, which is correspondingly indicated here.

Furthermore, the third K threshold SW3 is lowered in such a way that the entire K curve, i.e. also both curves KL-a and KL-b reach or intersect the third K threshold SW3 before the expiry of the longitudinal distance minimum value m.

Therefore, also in FIG. 2b, in the case of the unchanged behavior of the ego vehicle 1 and of the object 2 in comparison with FIG. 2a, that is to say a continuing approach and the increasing of the criticality level (K value) K, therefore, in turn when the partial braking phase II is initiated the K curve KL (criticality curve) is widened at a longitudinal distance d2 to form a wide band or wide region with the upper line KL-a and the lower line KL-b.

By introducing the minimum time period $\Delta t\_0$ (or in the location diagram of the longitudinal distance minimum value m) an excessively early onset of the emergency braking phase III is prevented; the emergency braking phase III therefore advantageously starts with a minimum time period $\Delta t\_0$ after the initiation of the warning phase I, which in the location diagram in FIG. 2 also correspondingly gives rise to an essentially constant spatial longitudinal distance minimum value m with a small tolerance in the X direction.

Therefore, in FIG. 2b an unambiguous engagement or onset of the emergency braking phase III is defined by virtue of the fact that at least the third K threshold SW3 or else only the third K threshold SW3 is correspondingly lowered in such a way that the entire K curve KL, that is to say both lines KL-a and KL-b are positioned so low that their intersection points are reliably below the lowered third K threshold SW3, i.e. still before the longitudinal distance d3. However, all three thresholds SW1, SW2, SW3 can also be simultaneously lowered.

FIGS. 3 and 4 show different dynamic or chronological profiles of the situation which can occur, in particular, in accordance with the behavior of the object 2 but also e.g. on the basis of changed coefficients of friction etc., in each case in the embodiment of FIG. 2b with the lowered criticality level K and the minimum time period $\Delta t\_0$ or longitudinal distance minimum value m.

According to FIG. 3, the criticality level K is reduced in comparison with FIG. 2b during the partial braking phase II, in particular owing to a change in behavior of the object 2 which, for example, accelerates or deviates laterally. Therefore, the curve KL bends downward in this diagram. According to the embodiment described in FIG. 2b with a lowered K threshold SW3, the emergency braking phase III is correspondingly not initiated here since both lines KL-a and KL-b still lie below the lowered third K threshold SW3.

Therefore, although firstly an emergency braking phase III is projected or predicted on the basis of the previous behavior or the driving dynamics with the initially sensed driving-dynamics value v1, a1, v2, a2, owing to the changed behavior in comparison with the projection (assumption), i.e. owing to current driving-dynamics values v1, a1 and the current measured longitudinal distance dx, the criticality curve KL is re-calculated and therefore the next starting point d3 is changed, therefore shifted to the rear here. In this context, according to FIG. 3 the emergency braking phase III is not reached since the K curve KL does not reach the lowered third threshold SW3.

In this context, in each case a current determination of the criticality level occurs only to current measured values so that in FIG. 3 the dashed-line trajectory T1 correspondingly represents the actual profile of the ego vehicle 1, wherein the current tolerances are correspondingly lower compared to the previously projected tolerances.

Therefore, no unnecessary emergency braking phase III is initiated. Instead, in the event of further lowering of the K curve KL the haptic warning phase or partial braking phase II, and also the warning phase I, can subsequently also be ended, so that normal travel occurs in turn, wherein the brake light signal S4 is also switched off in turn.

FIG. 4 shows a profile in which although the behavior of the object changes in such a way that the currently determined K curve KL drops and therefore the third K threshold SW3 is not reached, the situation is not yet ultimately resolved; therefore, it is shown here by way of example that the criticality level subsequently rises again, since, for example, the object 2 is braked again or is steered back again to the driving tube of the ego vehicle 1.

Such an increase in the K curve KL can also occur as a result of sensing of, for example, a further object, for example in the event of a mass accident. The K curve KL therefore rises again so that it subsequently intersects the third K threshold SW3 at the points d3a, d3b, so that the emergency braking phase III is correspondingly initiated. In this context, in each case a current determination of the criticality level also occurs on the basis of current measured values so that in FIG. 4 the dashed-line trajectory T1 correspondingly represents the actual profile of the ego vehicle 1, wherein the current tolerances are correspondingly lower in comparison with the previously projected tolerances.

Therefore, in particular according to the embodiment in FIG. 2b a defined onset of the emergency braking phase III can also be achieved in the case of the changed profiles according to FIGS. 3 and 4, wherein dynamic changes in the traffic situation are respectively sensed and taken into account as a changed K curve.

Figure 5:
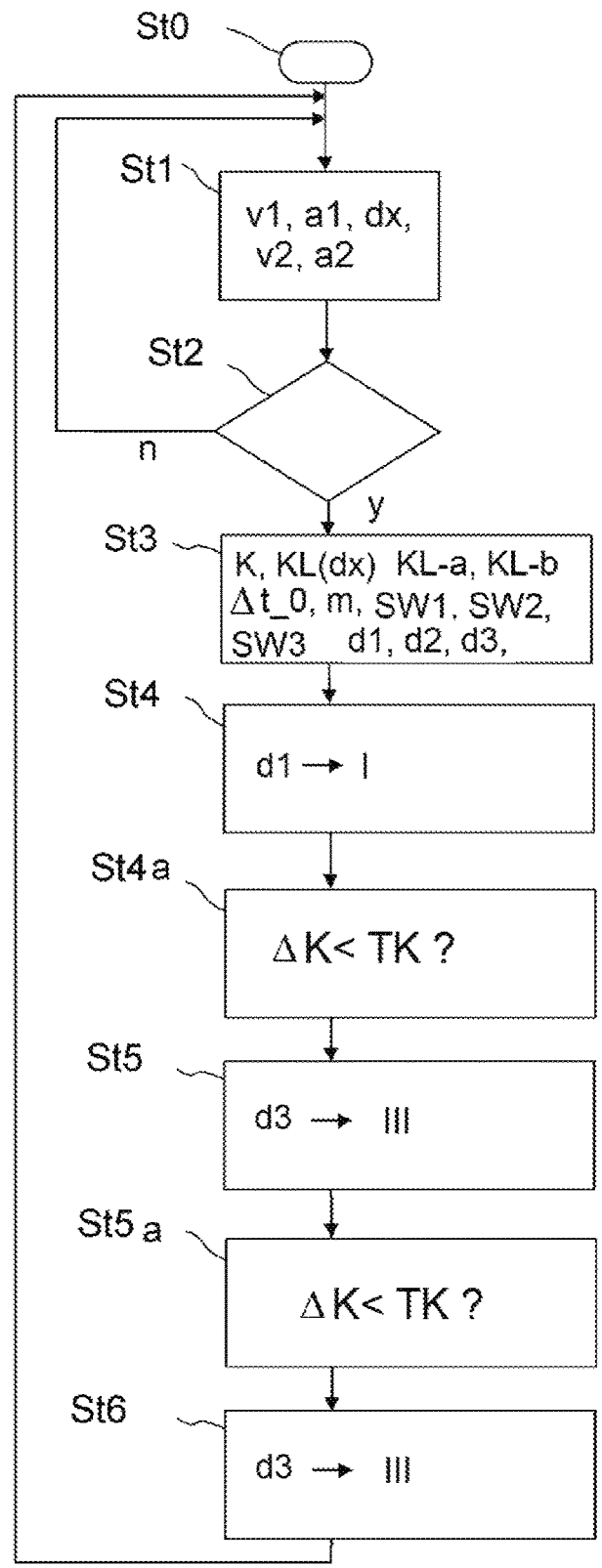
FIG. 5 shows a flow chart of a method according to an embodiment of the invention.

Therefore, e.g. the flow diagram in FIG. 5 is obtained for the method. A start of the method occurs in step St0, already at the start of the engine or at the beginning of the journey where $v1>0$. Subsequently, according to step St1 data is continuously captured, specifically in particular driving-dynamics values $v1$, $a1$ of the ego vehicle, and further distance measurement signals S1 of the distance sensor 4. Object detection and object classification are also carried out in the control device 6 according to step St1 on the basis of the distance measurement signal S1, during which detection and classification an object 2, e.g. a vehicle traveling ahead, is therefore detected as such. In this context, the driving behavior of the object 2, i.e. in particular $v2$ and $a2$, can also be correspondingly determined from the chronological behavior of the distance measurement signals S1.

In step St2, it is then determined on the basis of the driving-dynamics signals determined in step St1 whether an emergency braking behavior is to be initiated. If this is the case, according to the branch y step St3 is subsequently carried out, otherwise the method is reset.

In step St3, the projection described above with the determination of the criticality level as a function or curve KL in accordance with the longitudinal distance, and furthermore the minimum period is set as $\Delta t\_0$ or m, and the starting points d1, d2, d3 are determined.

In step St 4 the first escalation occurs, i.e. the initiation of the warning phase I at the first starting point d1, the second escalation in step St5, i.e. the initiation of the partial braking phase II at the second starting point d2, and the last escalation, i.e. initiation of the emergency braking phase III, in step St6. However, in this context in each case updating processing the steps St4a, St5a calculates whether d2 and d3 are still current and therefore whether current measured values are always used to check whether the next escalation is to be initiated.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SYMBOLS 1 ego vehicle
2 object
3 roadway
4 distance sensor
5 driving-dynamics system
6 control device of the driving dynamics systems 5
7 velocity sensor
8 wheel brakes
9 warning display or indicator, display or warning device
10 brake light
11 switch, operator control device
x1 first position, position of ego vehicle
x2 second position, position of object 2
a1 acceleration of ego vehicle, first longitudinal acceleration
v1 velocity of ego vehicle, first velocity
a2 second longitudinal acceleration
v2 second velocity, velocity of object 2
S1 distance measurement signal
S2 brake signal
S3 warning signal
S4 brake light signal
   (these reference signals are common to both applications)
   (for 608-411 A from here on)
SW1 first K threshold for the initiation of the warning phase I
SW2 second K threshold for the initiation of the partial braking phase II
SW3 third K threshold for the initiation of the emergency braking phase III
I warning phase
II partial braking phase, haptic warning phase
III emergency braking phase, AEB phase
K criticality level
KL criticality curve, K curve, criticality as a function of the longitudinal distance
KL-a upper curve of KL
KL-b lower curve of KL
$\Delta t\_0$ minimum time period
dx relative distance, longitudinal distance between ego vehicle 1 and object 2
d1 first distance value for the initiation of the warning phase I
d2 second distance value for the initiation of the partial braking phase II
d3 third distance value for the initiation of the emergency braking phase III
d3a, d3b third distance values as intersection points of the curves KL-a and KL-b with SW3 which represent the range or variance range of the initiation of the emergency braking phase III,
$\Delta t\_0$ minimum time period
m longitudinal distance minimum value (distance value which corresponds to the minimum time period $\Delta t\_0$)

p_hc partial braking brake pressure, low brake pressure
a_hc partial acceleration in the partial braking phase II
b_aeb emergency braking brake pressure, relatively high brake pressure
a_aeb high braking acceleration in emergency braking phase III

The invention claimed is:
1. A method for autonomous emergency braking of an ego vehicle, the method comprising:
   capturing driving-dynamics variables of the ego vehicle;
   capturing distance measurement signals;
   determining a longitudinal distance of the ego vehicle from an object in front,
   detecting an emergency braking situation based on the driving-dynamics variables and the distance measurement signals;
   advanced determining or projecting, in response to the detecting the emergency braking situation:
      a first starting point for initiation of a warning phase to output a warning signal without initiation of a braking operation,
      a second starting point for initiation of a subsequent partial braking phase with a partial-braking brake pressure, and
      a third starting point for initiation of a subsequent emergency braking phase with an emergency braking brake pressure greater than the partial-braking brake pressure,
   wherein the advanced determining or projecting of the first, second, and third starting point includes:
      setting up a minimum period criterion with at least one minimum period of the sum of the warning phase and partial braking phase, which is not undershot, and
      projecting, in advance in accordance with the longitudinal distance from the object, a criticality function that represents a criticality of a traffic situation,
   wherein K thresholds representing probability level thresholds for a collision of the ego vehicle for each of the initiation of the warning phase, the partial braking phase and the emergency braking phase are stipulated for the projected criticality function; and
   wherein at least the K threshold for the emergency braking phase is lowered such that, when the minimum period is reached, the criticality function has already exceeded the K threshold for the initiation of the emergency braking phase.
2. The method as claimed in claim 1, wherein the criticality of the traffic situation is a probability of a collision, between the ego vehicle and the object in front, determined by taking into account longitudinal dynamics as an equation of motion over time.
3. The method as claimed in claim 2, wherein during the determination a dynamic criterion is used with a longitudinal dynamics criterion for determination of a probability of an avoidance maneuver.
4. The method as claimed in claim 1, wherein during projection starting from the partial braking phase for taking into account relatively high tolerances, a relatively wide value range of the criticality curve is set up with a lower line and an upper line,
   wherein in the projected profile the upper line and the lower line have exceeded the third K threshold when the minimum period has been reached.

5. The method as claimed in claim 1, wherein the following K thresholds are specified:
   a first K threshold for the initiation of the warning phase,
   a second K threshold for the initiation of the partial braking phase,
   the third K threshold for the initiation of the emergency braking phase.
6. The method as claimed in claim 1, wherein after the initiation of the phases, previously determined starting points are updated based on current measured values and changed if the changes satisfy the minimum criterion.
7. The method as claimed in claim 6, wherein when a change in comparison with a projection is determined, the starting points are only shifted later in time and/or distance.
8. The method as claimed in claim 1, wherein the starting points are determined as longitudinal distances or starting times, and the minimum duration is set as a minimum warning time or a longitudinal distance minimum value.
9. A control device for a driving-dynamics system of an ego vehicle, the control device is configured to carry out a method as claimed in claim 1 and further configured to:
   directly or indirectly output brake signals to wheel brakes for initiation of a braking process of the ego vehicle and output a warning signal to a warning display or indicator for warning the driver.
10. An ego vehicle, comprising:
   wheel brakes for carrying out a braking process;
   a driving-dynamics system with a control device as claimed in claim 9; and
   a distance sensor for determining a longitudinal distance from the object in front and for outputting distance measurement signals to the control device.
11. A method for autonomous emergency braking of an ego vehicle, the method comprising:
   capturing driving-dynamics variables of the ego vehicle;
   capturing distance measurement signals indicating a longitudinal distance of the ego vehicle from an object in front;
   detecting an anticipated emergency braking situation based on the driving-dynamics variables and the distance measurement signals; and
   defining, in response to detecting the anticipated emergency braking situation, a criticality function, first, second, and third criticality thresholds, and a time period criterion, wherein:
      the criticality function defines an anticipated collision probability level as a function of time, the anticipated collision probability level being a probability of a collision between the ego vehicle and the object in front based on the driving-dynamics variables and the distance measurement signals,
      the first criticality threshold is a collision probability level defining initiation of a warning phase during which a warning signal is output without braking operation,
      the second criticality threshold is a collision probability level above which a partial braking phase, during which a partial-braking brake pressure is output, can be initiated,
      the third criticality threshold is a collision probability level above which an emergency braking phase, during which an emergency braking brake pressure is output, can be initiated, the emergency braking brake pressure being greater than the partial-braking brake pressure, and
      the time period criterion defines a minimum period of time after initiation of the warning phase and before initiation of the emergency braking phase, wherein the first, second, and third criticality thresholds and the time period criterion are defined, and the third criticality threshold subsequently lowered such that a collision probability level, defined by the criticality function for a time value that corresponds to the minimum period of time after the initiation of the warning phase, exceeds the third criticality threshold.

12. The method as claimed in claim 11, wherein the criticality function defines, for time values after which the collision probability level, as defined by the criticality function, first exceeds the first criticality threshold, a range of collision probability levels.

13. The method as claimed in claim 12, wherein the range of collision probability levels is determined based on a degree of uncertainty in the longitudinal dynamics of the vehicle introduced by the output of the partial-braking brake pressure.

14. The method as claimed in claim 12, wherein the first, second, and third criticality thresholds and the time period criterion are defined such that the lower end of the range of collision probability levels, defined by the criticality function for a time value that corresponds to the minimum period of time after the initiation of the warning phase, exceeds the third criticality threshold.

15. The method as claimed in claim 11, further comprising defining, in response to detecting the anticipated emergency braking situation, a dynamic criterion that provides a longitudinal distance of the ego vehicle from the object in front as a function of time, wherein the dynamic criterion takes into account an acceleration brought about by output of the partial-braking brake pressure in the partial braking phase and an acceleration brought about by output of the emergency braking brake pressure in the emergency braking phase.

16. The method as claimed in claim 11, further comprising, after defining the criticality function, the first, second, and third criticality thresholds, and the time period criterion:
    continuously capturing updated driving-dynamics variables of the ego vehicle and updated distance measurement signals indicating updated longitudinal distances between the ego vehicle and the object in front, and
    updating, based on the updated driving-dynamics variables of the ego vehicle and the updated distance measurement signals, the criticality function, the first, second, and third criticality thresholds, and the time period criterion.

17. The method as claimed in claim 16, further comprising initiating one or more of the warning phase, the partial braking phase, and the emergency braking phase based on the updated criticality function, the updated first, second, and third criticality thresholds, and the updated time period criterion.

* * * * *